United States Patent
Betin et al.

(10) Patent No.: US 9,503,182 B2
(45) Date of Patent: Nov. 22, 2016

(54) APPARATUS AND METHOD FOR REDUCING SIGNAL FADING DUE TO ATMOSPHERIC TURBULENCE

(71) Applicant: RAYTHEON COMPANY, Waltham, MA (US)

(72) Inventors: Alexander A. Betin, Manhattan Beach, CA (US); Vladimir V. Shkunov, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 45 days.

(21) Appl. No.: 14/464,096

(22) Filed: Aug. 20, 2014

(65) Prior Publication Data

US 2016/0056892 A1    Feb. 25, 2016

(51) Int. Cl.
*H04B 10/112* (2013.01)
*H04B 10/118* (2013.01)

(52) U.S. Cl.
CPC .......... *H04B 10/112* (2013.01); *H04B 10/118* (2013.01)

(58) Field of Classification Search
CPC .................................................. H04B 10/1123
See application file for complete search history.

(56) References Cited

U.S. PATENT DOCUMENTS

| | | | | |
|---|---|---|---|---|
| 5,710,652 A * | 1/1998 | Bloom | ................. | H04B 10/118 398/129 |
| 6,335,811 B1 * | 1/2002 | Sakanaka | ............... | H04B 10/11 398/129 |
| 6,590,685 B1 * | 7/2003 | Mendenhall | ............ | G01S 3/786 250/491.1 |
| 7,058,306 B1 | 6/2006 | Smith | | |
| 7,277,644 B2 | 10/2007 | Johnson et al. | | |
| 2004/0179848 A1 | 9/2004 | Belenkii | | |
| 2006/0018661 A1 * | 1/2006 | Green | ................ | H04B 10/1127 398/128 |
| 2007/0018124 A1 * | 1/2007 | Nishi | ................. | G02B 27/0025 250/559.36 |
| 2011/0227779 A1 * | 9/2011 | Harrington | ............. | G01S 7/497 342/28 |
| 2012/0251105 A1 * | 10/2012 | Kwok | ................. | G02B 6/0288 398/44 |
| 2013/0336661 A1 | 12/2013 | Chorvalli | | |

FOREIGN PATENT DOCUMENTS

EP    1 411 652 B1    4/2004

OTHER PUBLICATIONS

Farid, et al., "Outage Capacity Optimization for Free-Space Optical Links With Pointing Errors", Journal of Lightwave Technology, IEEE Service Center, New York NY, vol. 27, No. 01 Jul. 2007 (pp. 1702-1710).

(Continued)

*Primary Examiner* — Shi K Li
(74) *Attorney, Agent, or Firm* — Lewis Roca Rothgerber Christie LLP

(57) ABSTRACT

A method and system for reducing optical signal fading in an optical communication system include: dynamically obtaining turbulence-induced divergence and deviations of pointing direction for the atmosphere where an optical signal to be transmitted through; generating a single-transverse-mode laser beam of a predetermined diameter as the optical signal; dynamically varying the diameter of the laser beam to match the obtained turbulence-induced divergence of the atmosphere with a backtrack pointing direction; and transmitting the laser beam with varying diameter to a remote transceiver, as the optical signal.

12 Claims, 3 Drawing Sheets

(56) References Cited

OTHER PUBLICATIONS

Koehler, "New Optical Ground Station of the European Space Agency (ESA) at the Observatorio del Teide in Tenerife", Optical Telescopes of Today and Tomorrow, vol. 2871, Mar. 21, 1997 (4 pages).

Yenice, et al., "Adaptive Beam-Size Control Scheme for Ground-to-Satellite Optical Communications" Optical Engineering, Soc. of Photo-Optical Instrumentation Engineers, Bellingham, vol. 38, No. 11, Nov. 1, 1999 (pp. 1889-1895).

Written Opinion of the International Searching Authority for International Application No. PCT/US2015/037551, filed Jun. 24, 2015, Written Opinion of the International Searching Authority mailed Sep. 10, 2015 (9 pgs.).

International Search Report for International Application No. PCT/US2015/037551, filed Jun. 24, 2015, International Search Report dated Sep. 2, 2015 and mailed Sep. 10, 2015 (4 pgs.).

Giggenbach, Dirk; "Deriving an estimate for the Fried parameter in mobile optical transmission scenarios"; Applied Optics; vol. 50; No. 2; Jan. 10, 2011; 5pp.

\* cited by examiner

APPARATUS AND METHOD FOR REDUCING SIGNAL FADING DUE TO ATMOSPHERIC TURBULENCE

FIELD OF THE INVENTION

The present invention relates to optical signal processing and more specifically to an apparatus and method for reducing signal fading due to atmospheric turbulence.

BACKGROUND

Atmosphere is a very complex, time dependent turbulent medium for transmission of optical signals. Laser beam propagation in turbulent atmosphere can be accompanied by random beam wander (changing central direction of laser beam propagation) and strong aberrations with formation of inhomogeneous, also called speckled, spatial structure of the laser beam. Cross section of intensity profile of the speckled beam consists of randomly distributed bright spots ("speckles") divided by regions with low or zero light intensity. For typical horizontal path and space communication uplink scenarios, many speckles can form within the transmitted beam spot.

Time variation of the atmosphere parameters, such as local temperature and density of air, causes changes in the speckle distribution that appears as random "boiling" of speckle pattern, in other words, random movement of points of intensity maximums and minimums across the beam. This represents the scintillation effect, which appears as temporal fluctuation of laser beam intensity spatial distribution. That translates into fluctuation of a signal power acquired by a given aperture receiver. In particular, if the aperture is comparable to speckles size, received power can drop significantly for time intervals when the receiver happens to be between speckles. This effect is referred to as signal fading. Impact on signal fading by scintillation is mostly pronounced when speckle size is larger than the receiving aperture, which is practically always the case for long range ground to satellite uplink communication channel.

The random beam wander in turbulent atmosphere may also lead to significant reduction of the receiver signal power acquired when the laser beam shifts as a whole far enough outside the receiving aperture. This beam wander effect differs from temporally variable speckle motion driven by scintillation process. Its dynamics is usually much slower and impact from it can be minimized by adaptive adjustment of the laser beam pointing direction. Pointing adjustment cannot, unfortunately, reduce signal fading due to speckles boiling within the beam spot.

Fried parameter is a commonly accepted measure of the quality of optical transmission through the atmosphere due to random inhomogeneities in the atmosphere's refractive index induced by variations in temperature and thus density. The Fried parameter have units of length and is typically defined as the diameter of a circular area over which the RMS of atmosphere passage induced wavefront deviations from plain surface normal to original pointing direction is equal to 1 radian. Fried parameter defined this way integrates together two effects, wavefront tilts due to beam wander, and randomized variations of the wavefront shape at lateral scales smaller than the beam size.

Free space laser communication (lasercom) systems are currently being used for transfer of information between two points in atmosphere and/or space which utilize superimposing the information signal as time modulation onto directed laser beams serving as information carriers that propagate between those two transmitting and receiving points. Signal fading, an effect of random signal disappearing or reducing its power below a certain threshold level, is a well-known problem that limits performance of any electromagnetic waves based communication system. In particular case of lasercom systems operating through turbulent atmosphere, which are usually supplied by tracking system, signal fading occurs mostly due to scintillation phenomenon.

Other methods have been proposed to minimize signal fading due to scintillation effect in atmosphere for lasercom systems. These proposed methods include automatic gain control on a receiving amplifier, using large receiving aperture or multiple dispersed receiving apertures, and employing adaptive optics and phase conjugation. However, all of these proposed methods are not only technically complex and expensive to implement, but also, far from solving the signal fading problem, and usually add extra noise to communication signal. They also have limited capability in application to long communication links between ground and satellites.

SUMMARY OF THE INVENTION

The present invention is an apparatus and method that help to minimize or practically eliminate impact on signal fading caused by the scintillation effect in the atmosphere.

In some embodiments, the present invention is a method for reducing optical signal fading in an optical communication system. The method includes: dynamically obtaining turbulence-induced divergence and deviations of pointing direction for the atmosphere where an optical signal to be transmitted through; generating a single-transverse-mode laser beam of a predetermined diameter as the optical signal; dynamically varying the diameter of the laser beam to match the obtained turbulence-induced divergence of the atmosphere with a backtrack pointing direction; and transmitting the laser beam with varying diameter (and optionally, varying pointing direction) to a remote transceiver, as the optical signal.

In some embodiments, the present invention is an optical communication system for reducing optical signal fading. The system includes: an in/out gimbaled telescope including an aperture for capturing a down-link optical beam transmitted by a remote transceiver through the atmosphere; a steering mirror to direct the down-link optical beam through a beam sampler to monitor sampled portion of the down-link optical beam; a far field lens to receive the sampled portion and direct the sampled portion to a camera located at or near the focal plane of the far-field lens, wherein the camera monitors and measures a time dependent angle of arrival (a visible position of the remote transceiver) and a beam divergence of the sampled portion of the down-link optical beam, by tracking a center point position and finding a beam diameter of the down-link optical beam at the far field; a laser transmitter for generating a single-transverse-mode laser beam, an optical system for re-formatting the beam to a predetermined diameter as an up-link optical signal to be transmitted to the remote transceiver; and a processor including memory and I/O circuitry to determine an optimal diameter and a beam angle for the up-link optical signal to be transmitted to the remote transceiver, according to the measured instant angle and the beam divergence of arrival of the sampled portion of the down-link optical beam and the visible position of the remote transceiver, to dynamically set the diameter of the laser beam to the determined optimal diameter, and to dynamically set the direction of the laser beam to the determined beam angle.

In some embodiments, the remote transceiver is positioned in a satellite, which is in optical communication with a ground station.

The system and method of the present invention may also dynamically control a pointing direction of the transmitted optical signal towards a predicted location of the remote transceiver at a time of arrival of the optical signal at the remote transceiver.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
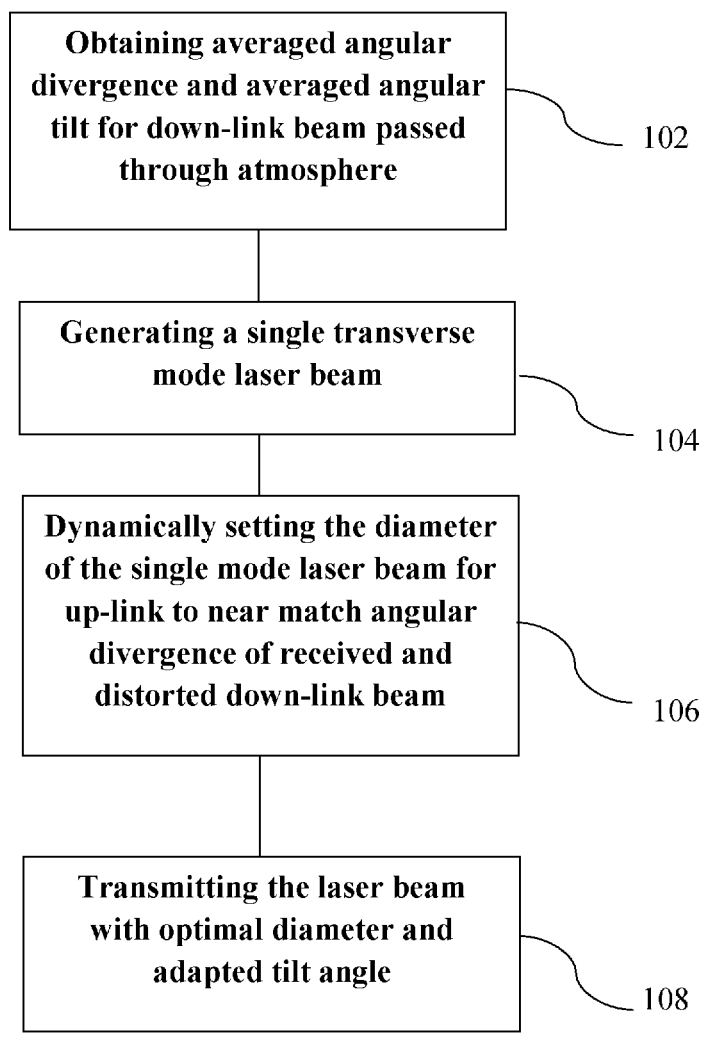
FIG. 1 is an exemplary process flow diagram, according to some embodiments of the present invention.

In some embodiments, the present invention is an apparatus and method for minimizing signal fading at a satellite receiver, using a proper selection or dynamic control of the laser output beam diameter, d_out, at the output plane of a ground-based transmitter, prior to sending the beam towards a receiver. In some embodiments, the present invention addresses the tilts and higher order beam distortions separately and independently. For this reason, the invention operates with a different parameter, transverse correlation scale parameter d_Θ, which is related to but differs from Fried parameter. d_Θ is defined below as a diameter of a diffraction limited Gaussian-like beam that has the same divergence value as a time averaged divergence that a large size collimated beam accumulates after propagation through a layer of turbulent atmosphere between two locations, transmitter and receiver. For near vertical propagation path under typical atmosphere conditions, the value of the transverse correlation scale parameter d_Θ typically varies in the range of 2.5-25 cm. Beam diameter of a Gaussian-like beam is determined equal to full width at level 1/e2 (FW1/e2) from maximum intensity, or otherwise a bucket size that encircles ~86% of total beam power.

In some embodiments, output power of the beam directed towards the satellite is assumed to be constant at the diameter d_out variations, and the transmitter beam is assumed to be generated by a single transverse mode laser and hence it is spatially coherent. The beam diameter is set near an optimal value, d_opt, that minimizes speckles formation in the transmitted beam at the target. The optimal diameter d_opt can be set at a given minimal value, or be adjusted for time variable atmosphere conditions. For example, for an uplink/down-link ground-to-satellite lasercom system operating at 1500-1600 nm wavelength, the variation of output beam diameter, d_out, is in the range 2.5-10 cm for typical atmosphere conditions. The variable diameter of the radiating beam serves a purpose of reducing number of speckles within the beam at a satellite orbit, ultimately (ideally) making the beam being represented just by a single lobe.

In some embodiments, the beam diameter control is combined with simultaneous dynamic control of the output beam pointing direction towards the receiver location where it will be at a time of the signal laser beam arrival. That addition helps to keep a center of wandering single lobed beam spot close to location of a satellite receiver aperture. Both beam diameter and pointing direction are defined by detection and analyzing of far-field distribution of a laser signal radiated by the satellite and received at the ground. That can be a sampled small portion of the beam carrying down-link communications signal, or a beam of a laser beacon located at the satellite.

In some embodiments, the instant divergence and angle of arrival (AoA) of the beam acquired by the receiver at the ground-based transmitter station is sampled and processed in the far-field at a slow rate much less than a Greenwood frequency, to measure average beam divergence around its central direction. For laser beam received on the ground from the satellite, fine structure of the wavefront varies with time at time scale characterized by a Greenwood frequency, which typically is about 500 Hz. Adaptive optics (AO) approaches dealing with real time tracking and correcting aberrated beam using wave front sensors and deformable mirrors usually require sampling received beam snapshots at rates typically faster than the Greenwood frequency to acquire beam aberrations at every instant.

However, the present invention does not need to track individual realizations of the aberrated wavefront. Rather, in some embodiments, divergence and central direction of the received beam, which are averaged over time much longer than time for small scale variations of the down-link wavefront, can be sufficient. The present invention utilizes the fact that average divergence and average tilt in the down-link beam vary in time much slower than instant realizations of local small scale wavefront aberrations. Measurements for the divergence and pointing direction of arrived beam assumed to be done with averaging time matching time scales of slow variations of each of these parameters. IN some embodiments, characteristic acquisition and processing time could be in a few Hertz to sub-Hertz range.

Optionally, a common shared output/input aperture and optical axis is provided for the receiver and transmitter (transceiver) at the ground station. This would allow to characterize down-link beam arriving from space through near the same path as the up-link beam to be sent to the satellite. Another option may be to separate the apertures laterally at a small distance. This is possible since the averaged characteristics of the atmosphere, which do not vary much for meters scale displacements across the nearly vertical beam path, are utilized by the present invention.

The invention then dynamically controls the diameter "d_out" of the uplink output beam (e.g., sent up from the transmitter at the ground), while keeping the diameter close to a d_opt value and such that the beam divergence is about equal to the measured divergence of the incoming down-link laser beam. This minimizes occurrence of speckle formation in the uplink beam after propagating through atmosphere towards the receiver at the satellite. Additionally, the beam diameter control may also be combined with simultaneous adaptive control of the output uplink beam pointing direction towards the satellite location on the orbit where it will be at a time of the uplink laser beam arrival.

FIG. 1 is an exemplary process flow diagram for reducing optical signal fading in an optical communication system, according to some embodiments of the present invention. As shown in block 102, turbulence-induced divergence and deviations of pointing direction, for example, averaged angular divergence of a down-link optical signal (due to atmospheric turbulence), is obtained. This can be obtained via direct measurements in the far field of the ground based system aperture. Due to aberrations experienced in the atmosphere, this divergence exceeds, usually significantly, diffraction limited divergence corresponding to aperture diameter of the receiving ground-based telescope. In block 104, a single-mode laser beam is generated to be transmitted as the up-link optical signal. The diameter d_out of the up-link beam is set to have this beam's diffraction limited divergence to near match to the averaged divergence of the incident down-link beam.

The diameter of the laser beam, d_out, is then dynamically varied, according to the obtained angular divergence data, in block 106. This may be done, for quiet atmosphere conditions, every set period of time, for example, in early morning, at noon, late afternoon and at night, when the atmosphere's refractive index distortions are different. Beam diameter may be updated in a real time for situations with rapidly changing weather.

In block 108, the diffraction limited laser beam with optimal diameter is transmitted to a remote receiver, as the optical signal. In some embodiments, the transmission direction is varied in time to match backward direction to the averaged angle of arrival of the received distorted down-link beam.

Figure 2:
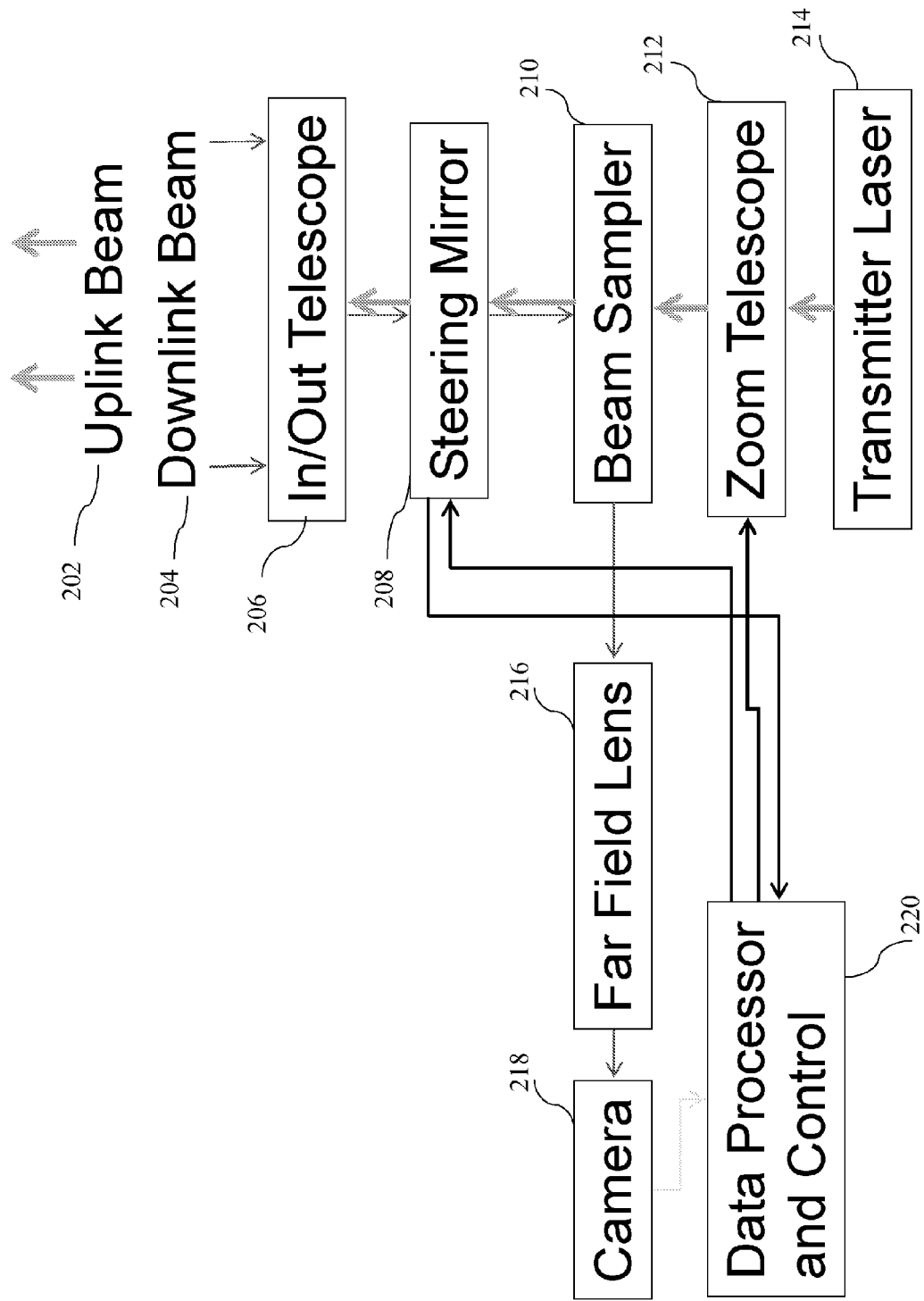
FIG. 2 shows an exemplary block diagram of an apparatus, according to some embodiments of the present invention.

FIG. 2 shows an exemplary block diagram of an apparatus, according to some embodiments of the present invention. As shown, for example, at a ground station, an in/out gimbaled telescope 206 with a large size aperture (for example, 20 cm or larger) captures down-link beam of light 204 coming through the atmosphere, for example, from a satellite. The down-link light beam 204 is generated by a laser source radiated by the source (satellite) on the opposite side of the link and has passed through the atmosphere. This beam can be either information carrying signal down-link beam, or a beacon beam if available, to sample and measure the divergence and AoA of the down-link beams.

A steering mirror 208 is used to direct the down-link beam to a beam sampler 210. The beam sampler 210 may be a beam splitter with low reflectivity towards sample channel to avoid/minimize power loss in the optical path for both received and transmitted backward laser radiation (at ground station).

The beam sampler 210 then samples a small portion (for example, <~1% of total received signal power) of the down-link beam, and sends the sampled portion to a far field lens 216. The far field lens 216 then directs the sampled portion to a camera 218 located at or near the focal plane of the far-field lens. The camera 218 may be a charge coupled device (CCD) camera that is positioned at the far field plane of the down-link beam to measure angular characteristics, divergence and tilts of the sampled down-link beam.

The camera measures the incoming down-link beam's instant angle of arrival and its beam divergence, and the visible position of the source (satellite), by monitoring the incoming beam center point position and beam diameter at the far field. The measurement data is then used by processor/controller (including memory and I/O circuitry) 220 to determine both the optimal output uplink beam diameter for scintillation reduction, and the beam angle of return to be aimed at the satellite. Feedback control of the steering mirror 208 may keep the sampled beam aligned to a particular point in the camera 218 field of view area and at the same time, may provide aiming of the transmitter 214 beam back to the satellite.

Additionally, a transmitter laser 214 generates the diffraction quality optical signal to be transmitted as the uplink beam 202. In some embodiments, based on the measurement data, adaptive control is applied (by the measurement) to a zoom telescope 212 to set instant transmitter output beam diameter, d_out. The zoom telescope may include three sequential lenses, one or two of which can be synchronously moved to change telescope magnification but keeping collimation of the output beam. In some embodiments, based on the measurement data, adaptive control is also applied (by the measurement) to the steering mirror 208 to point the direction angle of the uplink beam to the calculated values, including lead angle correction (for moving satellite, as example), which account also for time-varying measured angle of arrival for down-link beam.

In some embodiments, the optimal uplink output beam is made collimated. But its diameter is chosen based on making the divergence of the diffraction quality uplink output beam about or equal to the measured divergence of the incoming down-link laser beam distorted by the atmosphere, that is d_out about equal to d_Θ. This condition minimizes occurrence of speckle formation in the uplink beam after propagating through atmosphere towards the receiver at the satellite. It allows also keeping the overall spot size at the orbit not much larger than it would be using up-link beam with diameter at the output filling full aperture of the transmitter telescope. This helps to avoid/minimize loss of power transmitted to the satellite receiver. Indeed, transmitted beam brightness and intensity at the orbit are same as for the case of the up-link beam utilizing the transmitter's full aperture.

In general, larger diameter size for diffraction quality output beam generates approximately the same size of an illuminated light spot at the orbit. The reason is that the uplink beam divergence, which near the ground is smaller for larger size apertures, will be distorted and increased after passing up through the atmosphere. Accordingly, the uplink beam acquires eventually about same divergence as that measured for the incident beam, which have passed through the same atmospheric turbulence. At the same time, a smaller and optimal diameter size radiated beam results in initial divergence larger than minimal divergence would be if entire transmitter aperture is used. However, the extra divergence matches a turbulence-induced addition to divergence of beam distorted by the atmosphere.

A non-zero error of beam pointing to the satellite receiving aperture may increase the scintillation effect and thus resulting in speckles formation over the laser spot at the orbit even if output diameter is optimized. For this reason, up-link beam pointing is back-tracking in real time the angle of arrival of the received down-link beam. In some embodiments, the angle of return of the uplink beam is chosen to aim the beam at the destination (satellite) towards the location on the orbit where the satellite will be at the time of the uplink laser beam arrival.

In other words, this beam is returned near backward to the incoming down-link beam with a certain pre-calculated lead ahead angle shift (added to the measured down-link beam angle of arrival) to compensate for satellite movement during the time the laser light travels from satellite to the ground and back to satellite, including the reaction time at the ground station required for measurement of the down-link beam size and angle of arrival. The measured data is then processed and control is applied to the size and direction of the output uplink beam.

Figure 3:
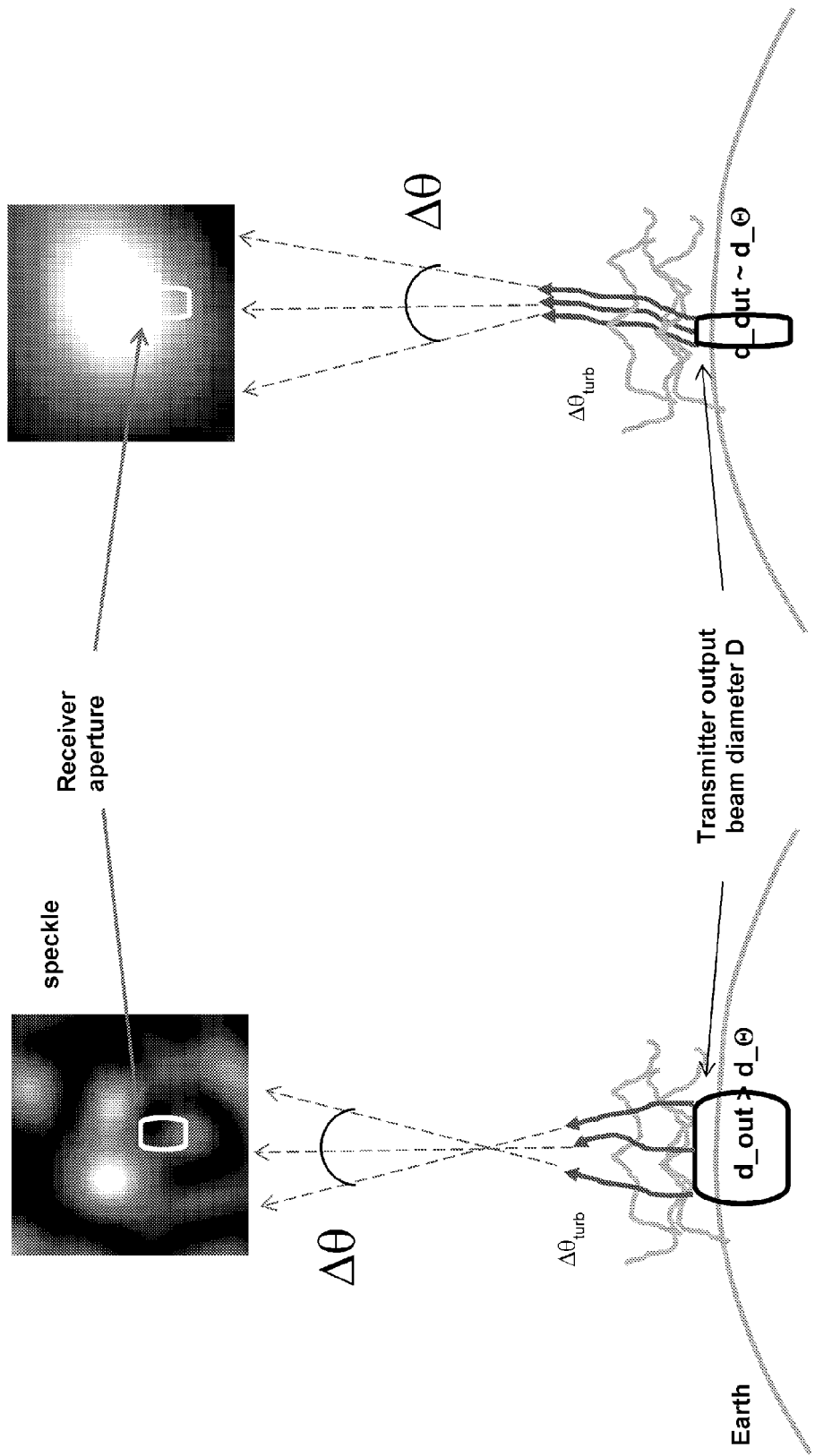
FIG. 3 is an exemplary diagram illustrating a signal fading reduction effect, according to some embodiments of the present invention.

FIG. 3 is an exemplary diagram illustrating a signal fading reduction effect, according to some embodiments of the present invention. The left half of the diagram shows a randomized wavefront travelling through the atmosphere and developing a speckle at the satellite receiver aperture for the case when the upward radiated beam diameter d_out is larger than the optimal size d_opt (which is assumed to be about d_Θ). This optimal diameter refers to a transverse correlation scale parameter d_Θ for the incident down-link beam wavefront. The incident down-link beam at the ground aperture can be envisioned as consisting of several, about $(D/d\_\Theta)^2$, adjacent wavelets of the correlation scale size d_Θ covering entire transmitter aperture of diameter D. Down-link beam distortions mean that local incidence angle of arrival (ray direction, defined by local normal to the wavefront) vary over the receiver aperture from wavelet to wavelet. Hence, if the output uplink beam has got flat wavefront characterized by a common direction over entire aperture, rays for the uplink beam deviate from accurately backward direction to the down-link signal rays. As a result, different wavelets will send up rays which will be mixed up in the atmosphere, as shown at the left part of the FIG. 3, resulting in speckles formation in the far field (on the orbit).

The right half of the diagram illustrates conditions for irradiating uplink beam with minimal or eliminated speckles formation. The uplink beam is irradiated having diameter d_out, which is about or slightly smaller than d_Θ, and which is usually much smaller than the diameter D of the aperture receiving the down-link beam. The uplink beam is radiated, effectively, by only one of the local wavelets. Thus, it matches transverse correlation size of the atmosphere path, so it is not broken by propagation through the turbulent air, but follows as a solid packet of rays towards the satellite. Also, local direction of the radiation is matched in the real time to be backward to the local direction of received beam at this wavelet. This ensures that the rays' packet will be delivered accurately to the satellite laser source.

In the latter case, the beam divergence ΔΘ, after travelling through the atmosphere, is comparable to that when the entire transmitter aperture D irradiates diffraction limited beam, giving same beam diameter at the orbit as with the actual output beam of diameter d_out, which is always smaller than D. Also, as shown, the speckle formation near the beam axis is reduced only for the case of the output beam diameter d_out matching the correlation scale d_Θ and thus making it the optimal operation point corresponding to near maximal power and minimal scintillation delivered to the receiver.

The uplink output beam initial diameter, d_out, is defined as full width defined by $1/e^2$ intensity level (FW1/e2) beam diameter, which is diameter of a near Gaussian intensity distribution profile at exp(−2) reduction level from maximum intensity. The beam initial diameter is dynamically controlled to be about equal to its optimal value:

$$d\_opt \sim d\_\Theta = (4/\pi)*\lambda/\Theta \quad (1)$$

where λ—operating central wavelength, Θ—measured down-link beam divergence at FW1/e2 intensity level. Value of Θ equals to beam diameter (at FW1/e2 intensity level, or diameter of the circle contained ~86% of encircled power, measured by camera or other adequate device) at focal plane of the far field lens, divided to the focal length of that far field lens. Alternatively, for a simplified implementation, the diameter can be set to its minimal value, which corresponds to a maximal divergence Θ commonly observed for typical atmosphere conditions near this location on the ground.

For near vertical propagation path through the atmosphere (e.g., ground-to-satellite lasercom), the transverse correlation scale parameter, d_Θ, value varies typically in the range 2.5-25 cm. Thus, anticipated value of the optimal output beam diameter is no less than ~2.5 cm. The upper value would be reasonable to limit at the level corresponding to the beam diffraction length about equal to the length of the effective atmosphere layer near the ground that gives majority of contribution to the speckle formation and scintillation, for the case of real time adaptive control of the output beam diameter. In some cases, the estimate provides a value of about 10 cm. Optimal beam diameters larger than 10 cm may increase the signal power acquired by the satellite (maybe useful for lasercom at very long distances, i.e. Moon, planets). However, it may not be worth doing so due to increasing complexity of beam parameters measurements and control. For practical applications, the required acquisition rate can differ for down-link beam divergence and angle of arrival measurements, but anywhere it will be much less then characteristic Greenwood frequency (<~500 Hz), and is expected in some cases to be in a few Hertz to sub-Hertz range.

Real time down-link beam divergence measurement can be useful for improving SNR stability for the down-link information transmission by dynamically controlling the aperture through which the received down-link signal goes to the detector.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for reducing optical signal fading in an optical communication system, the method comprising:
   receiving a down-link optical signal from a satellite through the atmosphere;
   sampling and processing an instant divergence and an angle of arrival (AoA) of the received down-link optical signal in the far-field at a sampling rate less than the Greenwood frequency to measure turbulence-induced divergence and an average beam divergence of the received down-link optical signal around its central direction over time;
   generating a single-transverse-mode laser beam of a predetermined diameter for an up-link optical signal for transmission to the satellite;
   setting the predetermined diameter of the laser beam to near match a near diffraction-limited divergence of the up-link optical signal to the measured turbulence-induced divergence;
   setting a transmission direction of the up-link optical signal to measured average beam divergence of the received down-link beam; and
   transmitting the up-link optical signal with the set diameter and the set transmission direction to the satellite.

2. The method of claim 1, further comprising dynamically controlling a direction of the up-link optical signal towards a predicted location of the satellite at a time of arrival of the optical signal at the satellite.

3. The method of claim 1, wherein a receiver and a transmitter of a ground transceiver include a common output/input aperture and optical axis to allow for characterizing the down-link optical signal arriving from space through the same path as the laser beam to be transmitted to the satellite.

4. The method of claim 3, wherein the receiver and the transmitter of the ground transceiver, each include an aperture, and wherein the apertures are spatially separated.

5. The method of claim 1, wherein the down-link optical signal is a sampled portion of a down-link communication signal or a beacon beam.

6. The method of claim 1, wherein setting the diameter of the laser beam further comprises dynamically varying in time a transmission direction of the up-link optical signal with varying diameter to near match a direction backward to an angle of arrival of the down-link optical signal.

7. The method of claim 1, further comprising dynamically adjusting a direction of the up-link optical signal for transmitting the up-link optical signal towards a predicted location of the satellite at a time of arrival of the up optical signal at the satellite.

8. An optical communication system for reducing optical signal fading comprising:
- an in/out gimbaled telescope including an aperture for capturing a down-link optical beam transmitted by a remote transceiver through the atmosphere;
- a steering mirror to direct the down-link optical beam to a beam sampler to sample an instant divergence and an angle of arrival (AoA) of a portion of the down-link optical beam at a sampling rate less than the Greenwood frequency;
- a far field lens to receive the sampled portion and direct the sampled portion to a camera located at or near the focal plane of the far-field lens, wherein the camera measures turbulence-induced divergence and an average beam divergence of the down-link optical beam around its central direction over time by measuring a beam center point position and a beam diameter of the downlink optical beam at the far field of the far field lens;
- a laser transmitter for generating a single-transverse-mode laser beam of a predetermined diameter as an up-link optical signal to be transmitted to the remote transceiver; and
- a processor including memory and I/O circuitry to determine an optimal beam diameter and a beam direction angle for the up-link optical signal to be transmitted to the remote transceiver, according to the measured turbulence-induced divergence and an average beam divergence of the down-link optical beam, to set the diameter of the laser beam to the determined optimal beam diameter, and to set the transmission direction of the laser beam to the measured average beam divergence of the down-link optical beam.

9. The system of claim 8, wherein the remote transceiver is positioned in a satellite.

10. The system of claim 8, wherein the camera is a charge coupled device (CCD) camera that is positioned at the far field plane of the optical beam to measure angular characteristics, divergence and tilts of the sampled portion of the down-link optical beam.

11. The system of claim 8, further comprising a zoom telescope, wherein the processor applies adaptive control to the zoom telescope to set the diameter of the laser beam to the determined optimal diameter.

12. The system of claim 11, wherein the zoom telescope includes three sequential lenses, one or two of which are capable of being synchronously moved to change a magnification of the in/out gimbaled telescope, while keeping collimation of the up-link optical signal.

\* \* \* \* \*